United States Patent
Mizukami et al.

(10) Patent No.: US 12,175,029 B2
(45) Date of Patent: Dec. 24, 2024

(54) INSTRUCTION DEVICE, IMAGE GENERATION DEVICE, DRAWING SYSTEM, COMMUNICATION METHOD, AND COMMUNICATION PROGRAM

(71) Applicant: FUJIFILM Corporation, Tokyo (JP)

(72) Inventors: Hiroyuki Mizukami, Saitama (JP); Yasushi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/187,459

(22) Filed: Mar. 21, 2023

(65) Prior Publication Data

US 2023/0325013 A1 Oct. 12, 2023

(30) Foreign Application Priority Data

Mar. 24, 2022 (JP) .................................. 2022-049073

(51) Int. Cl.
| | |
|---|---|
| *G06F 3/038* | (2013.01) |
| *G06F 3/01* | (2006.01) |
| *G06F 3/02* | (2006.01) |
| *G06F 3/03* | (2006.01) |
| *G06F 3/0346* | (2013.01) |
| *G06F 3/0354* | (2013.01) |
| *G06F 3/04883* | (2022.01) |

(52) U.S. Cl.
CPC ............ *G06F 3/0386* (2013.01); *G06F 3/016* (2013.01); *G06F 3/02* (2013.01); *G06F 3/0304* (2013.01); *G06F 3/0346* (2013.01); *G06F 3/03542* (2013.01); *G06F 3/0383* (2013.01); *G06F 3/04883* (2013.01)

(58) Field of Classification Search
CPC .......... G06F 3/0386; G06F 3/016; G06F 3/02; G06F 3/0304; G06F 3/0346; G06F 3/03542
USPC ......................................................... 345/156
See application file for complete search history.

(56) References Cited

U.S. PATENT DOCUMENTS

| | | | |
|---|---|---|---|
| 2006/0119569 A1* | 6/2006 | Tsai | H04B 10/1143 345/156 |
| 2014/0375573 A1 | 12/2014 | Idzik et al. | |
| 2017/0031470 A1 | 2/2017 | Chae | |
| 2019/0113986 A1* | 4/2019 | Bikumala | G06F 3/017 |
| 2019/0317704 A1 | 10/2019 | Yanagi et al. | |
| 2019/0369752 A1 | 12/2019 | Ikeda et al. | |

(Continued)

FOREIGN PATENT DOCUMENTS

JP 2011-118523 A 6/2011

OTHER PUBLICATIONS

The extended European search report issued by the European Patent Office on Jul. 21, 2023, which corresponds to European Patent Application No. 23163560.8-1224 and is related to U.S. Appl. No. 18/187,459.

*Primary Examiner* — Calvin C Ma
(74) *Attorney, Agent, or Firm* — Studebaker & Brackett PC

(57) ABSTRACT

The instruction device includes a light source that emits light and a processor, in which the instruction device transmits a first signal representing information related to a drawing condition of the drawing image to an image generation device that generates a drawing image based on a detection result obtained by detecting the light, and receives a second signal representing information related to a detection state of the light from the image generation device.

17 Claims, 10 Drawing Sheets

(56) References Cited

U.S. PATENT DOCUMENTS

| | | | |
|---|---|---|---|
| 2020/0064985 A1* | 2/2020 | Mannby | G06F 3/0488 |
| 2021/0117015 A1 | 4/2021 | Ida et al. | |
| 2022/0066577 A1* | 3/2022 | Watanabe | G06F 3/0346 |

* cited by examiner

INSTRUCTION DEVICE, IMAGE GENERATION DEVICE, DRAWING SYSTEM, COMMUNICATION METHOD, AND COMMUNICATION PROGRAM

CROSS REFERENCE TO RELATED APPLICATIONS

This application claims priority from Japanese Application No. 2022-049073, filed on Mar. 24, 2022, the entire disclosure of which is incorporated herein by reference.

BACKGROUND

1. Technical Field

The present disclosure relates to an instruction device, an image generation device, a drawing system, a communication method, and a non-transitory storage medium storing a communication program.

2. Related Art

In the related art, a technique of performing a drawing in space with light using a light-emitting drawing device such as a light pen is known.

For example, in JP2011-118523A, a technique is described in which a user performs a drawing in the air with a light pen provided with a light emitting diode, a camera captures the light pen in which the light emitting diode is lit, and a trajectory of the light pen is detected from a captured image and displayed.

By the way, in a case where a user who performs a drawing with the drawing device is different from a user who operates the camera that captures the light emitted from the drawing device, the user who performs a drawing may not know the timing of capturing the image, so there is room for improvement in operability because it is unclear how the drawing is performed.

SUMMARY

The present disclosure has been made in view of the above circumstances, and provides an instruction device, an image generation device, a drawing system, a communication method, and a non-transitory storage medium storing a communication program capable of improving an operability of a user who performs a drawing.

In order to achieve the above object, an instruction device according to a first aspect of the present disclosure comprises: a light source that emits light; and a processor, in which the instruction device transmits a first signal representing information related to a drawing condition of the drawing image to an image generation device that generates a drawing image based on a detection result obtained by detecting the light, and receives a second signal representing information related to a detection state of the light from the image generation device.

In the instruction device of a second aspect of the present disclosure according to the instruction device of the first aspect, the processor is configured to execute a notification operation in which the image generation device notifies a user, based on the information related to the detection state.

In the instruction device of a third aspect of the present disclosure according to the instruction device of the second aspect, the notification operation is an operation of vibrating the instruction device.

In the instruction device of a fourth aspect of the present disclosure according to the instruction device of any one of the first aspect to the third aspect, the drawing condition is a condition related to a line to be drawn based on the detection result of the light.

The drawing condition is a type of effect that is drawn based on the trajectory of the light.

In the instruction device of a fifth aspect of the present disclosure according to the instruction device of any one of the first aspect to the third aspect, the drawing condition is a condition related to an effect to be drawn based on the detection result of the light.

The instruction device of a sixth aspect of the present disclosure according to the instruction device of any one of the first aspect to the fifth aspect, includes an acceleration sensor, in which the drawing condition includes a condition that is changed based on a detection result of the acceleration sensor.

The instruction device of a seventh aspect of the present disclosure according to the instruction device of any one of the first aspect to the fifth aspect, includes a drawing switch that is operated for designating the drawing condition.

In the instruction device of an eighth aspect of the present disclosure according to the instruction device of any one of the first aspect to the seventh aspect, the instruction device defines a period, during which the light is being detected by the image generation device, as an in-drawing period.

The instruction device of a ninth aspect of the present disclosure according to the instruction device of any one of the first aspect to the seventh aspect, includes an instruction switch for performing a drawing start instruction and a drawing end instruction, in which the instruction device transmits a drawing start signal to the image generation device in a case in which the drawing start instruction is given from the instruction switch, transmits a drawing end signal to the image generation device in a case in which the drawing end instruction is given from the instruction switch, and defines a period from in a case in which the drawing start signal is transmitted until in a case where the drawing end signal is transmitted, as an in-drawing period.

In the instruction device of a tenth aspect of the present disclosure according to the instruction device of any one of the first aspect to the ninth aspect, the instruction device has a print function of printing the drawing image generated by the image generation device.

In the instruction device of an eleventh aspect of the present disclosure according to the instruction device of any one of the first aspect to the tenth aspect, the instruction device is a drawing device for a space drawing.

In order to achieve the above object, an image generation device according to a twelfth aspect of the present disclosure comprises: a camera that captures light emitted from an instruction device; and a processor that is configured to generate a drawing image based on a detection result of light detected from a captured image, which is captured by the camera, in which the image generation device receives a first signal representing information related to a drawing condition of the drawing image from the instruction device, and transmits a second signal representing information related to a detection state of the light to the instruction device.

In order to achieve the above object, a drawing system according to a thirteenth aspect of the present disclosure comprises: an instruction device including a light source that emits light and a processor; and an image generation device including a camera that captures light emitted from the instruction device and a processor that is configured to generate a drawing image based on a detection result of light detected from a captured image, which is captured by the camera, in which the drawing system transmits a first signal representing information related to a drawing condition of the drawing image from the instruction device to the image generation device, and transmits a second signal representing information related to a detection state of the light from the image generation device to the instruction device.

In order to achieve the above object, a communication method according to a fourteenth aspect of the present disclosure executed by a processor of an instruction device including a light source that emits light and the processor, the communication method comprises: transmitting a first signal representing information related to a drawing condition of the drawing image to an image generation device that generates a drawing image based on a detection result obtained by detecting the light; and receiving a second signal representing information related to a detection state of the light from the image generation device.

In order to achieve the above object, a communication method according to a fifteenth aspect of the present disclosure executed by a processor of an image generation device including a camera that captures light emitted from an instruction device and the processor that is configured to generate a drawing image based on a detection result of light detected from a captured image, which is captured by the camera, the communication method comprises: receiving a first signal representing information related to a drawing condition of the drawing image from the instruction device; and transmitting a second signal representing information related to a detection state of the light to the instruction device.

In order to achieve the above object, a non-transitory storage medium storing a communication program according to a sixteenth aspect of the present disclosure that is executed by a processor of an instruction device including a light source that emits light and the processor, the communication program for causing the processor to execute processing including: transmitting a first signal representing information related to a drawing condition of the drawing image to an image generation device that generates a drawing image based on a detection result obtained by detecting the light; and receiving a second signal representing information related to a detection state of the light from the image generation device.

In order to achieve the above object, a non-transitory storage medium storing a communication program according to a seventeenth aspect of the present disclosure that is executed by a processor of an image generation device including a camera that captures light emitted from an instruction device and the processor that is configured to generate a drawing image based on a detection result of light detected from a captured image, which is captured by the camera, the communication program for causing the processor to execute processing including: receiving a first signal representing information related to a drawing condition of the drawing image from the instruction device; and transmitting a second signal representing information related to a detection state of the light to the instruction device.

According to the present disclosure, it is possible to improve the operability of a user who performs a drawing.

DETAILED DESCRIPTION

Hereinafter, examples of embodiments for performing the technique of the present disclosure will be described in detail with reference to the drawings.

Figure 1:
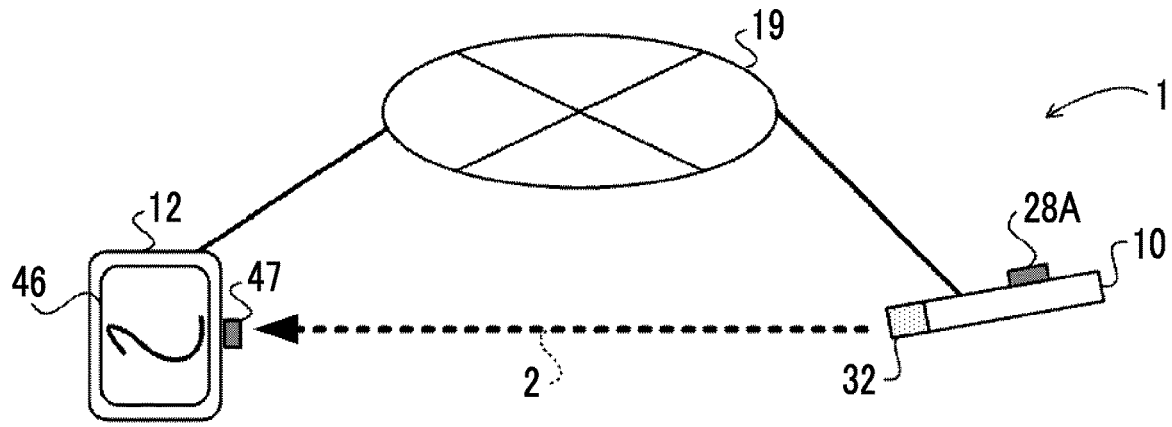
FIG. 1 is a configuration diagram showing an example of a configuration of a space drawing system according to an embodiment.

A configuration of a space drawing system 1 of the present embodiment will be described with reference to FIG. 1. As shown in FIG. 1, the space drawing system 1 of the present embodiment includes a drawing device 10 that performs a drawing with light 2 emitted from a light source 32 and a smartphone 12 that generates a drawing image based on a detection result of the light 2 detected from a captured image, which is captured by the camera 47. The drawing device 10 and the smartphone 12 are connected to each other via a network 19 by wired communication or wireless communication. The space drawing system 1 of the present embodiment is an example of a drawing system of the present disclosure.

Figure 2:
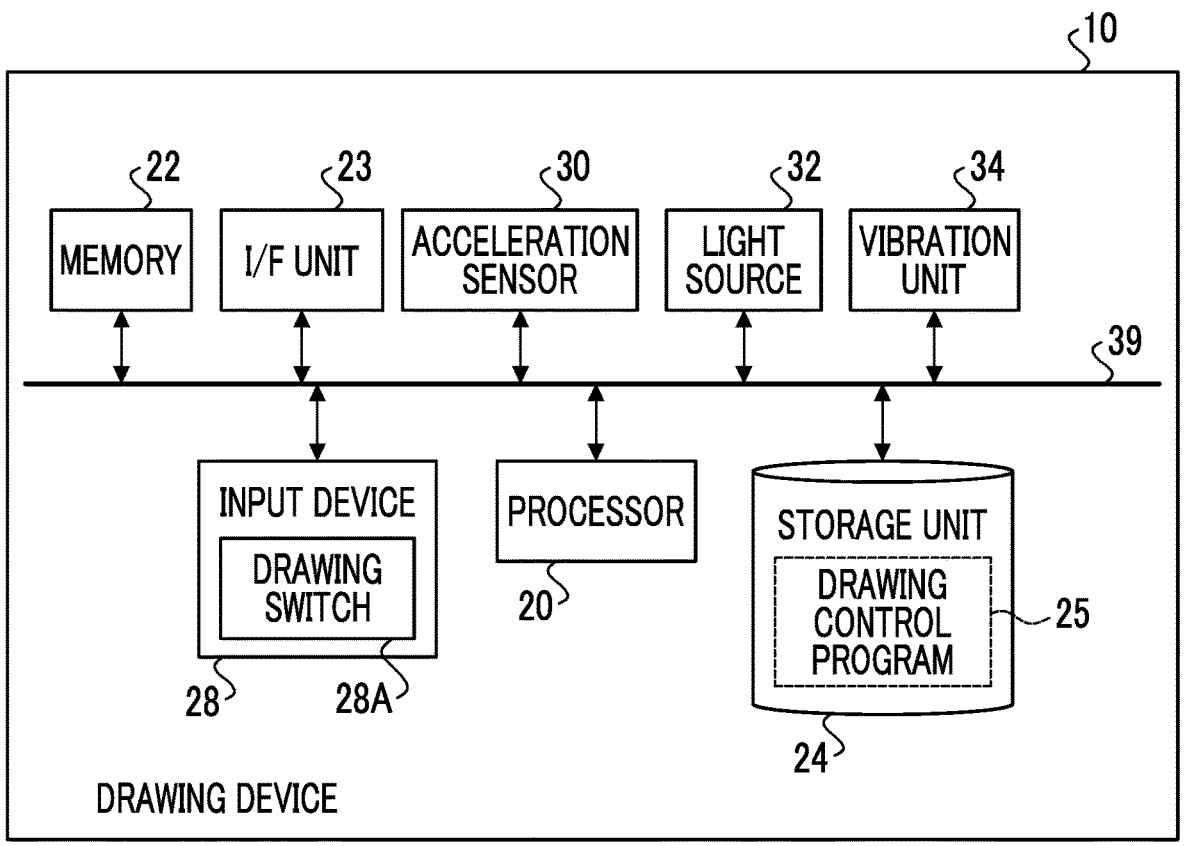
FIG. 2 is a block diagram showing an example of a hardware configuration of a drawing device according to the embodiment.

A configuration of the drawing device 10 according to the present embodiment will be described with reference to FIG. 2. The drawing device 10 of the present embodiment is a device for a user to perform drawing in space with light emitted from a light source 32 in a case where the user, who performs the drawing, holds and moves the drawing device 10 that emits light from the light source 32. As an example, in the present embodiment, a light pen type drawing device 10 will be described. The drawing device 10 of the present embodiment is an example of an instruction device of the present disclosure.

As an example, in the present embodiment, a user, who performs drawing by using the drawing device 10, and a user, who captures light emitted from the drawing device 10 to generate a drawing image by using the smartphone 12, are different users. In the present embodiment, in order to distinguish between the two users, a user, who performs drawing by using the drawing device 10, is referred to as a "drawing user", and a user, who performs imaging and generation of a drawing image by using the smartphone 12, is referred to as an "imaging user".

First, the details of the drawing device 10 will be described. FIG. 2 shows a block diagram representing an example of a configuration related to a function for space drawing in the drawing device 10. As shown in FIG. 2, the drawing device 10 includes a processor 20, a memory 22, an I/F (Interface) unit 23, a storage unit 24, an input device 28, an acceleration sensor 30, a light source 32, and a vibration unit 34. The processor 20, the memory 22, the I/F unit 23, the storage unit 24, the input device 28, the acceleration sensor 30, the light source 32, and the vibration unit 34 are connected to each other via a bus 39 such as a system bus or a control bus so that various types of information can be exchanged.

The processor 20 reads various programs including a drawing control program 25 stored in the storage unit 24 into the memory 22 and executes processing according to the read program. The memory 22 is a work memory for the processor 20 to execute the processing. The storage unit 24 stores the drawing control program 25, various other information, and the like. The drawing control program 25 of the present embodiment is an example of a communication program of the present disclosure. Specific examples of the storage unit 24 include a hard disk drive (HDD) and a solid state drive (SSD).

The I/F unit 23 communicates various types of information with the smartphone 12 by wireless communication or wired communication. The input device 28 including a drawing switch 28A functions as a user interface. The drawing switch 28A is a switch that is operated to input various instructions in a case where the user performs drawing and is provided on a surface of a main body of the drawing device 10.

As an example, the drawing switch 28A of the present embodiment is a three-step switch, and first, in a case where the drawing user presses the drawing switch 28A as a first step, the drawing start, which is according to a drawing condition set as the first step, is designated by the drawing user. Further, in a case where the drawing user presses the drawing switch 28A more strongly than in the first step as a second step, the fact that the drawing according to a drawing condition set as the second step is performed, is designated by the drawing user. Further, in a case where the drawing user presses the drawing switch 28A more strongly than in the second step as a third step, the fact that the drawing switch 28A is returned to its original state and the drawing is ended, is designated by the drawing user.

The acceleration sensor 30 is a sensor for detecting an acceleration in movement of the moving drawing device 10 and outputs information representing the detected acceleration as a detection result.

The light source 32 emits light for drawing, and examples thereof include a light emitting diode (LED). As an example, in the present embodiment, a high luminance type LED is used. Further, in order to improve a light detection rate of the light source 32 in the smartphone 12, an LED having an emission color of pure green is adopted instead of a color mixture such as yellow green or the like. Further, since it is preferable that light leakage is small, a light source having high directivity is adopted.

The vibration unit 34 is for vibrating the entire drawing device 10. Examples of the vibration unit 34 include a motor and the like. The vibration of the drawing device 10 by the vibration unit 34 propagates to the drawing user who holds the drawing device 10.

Figure 3:
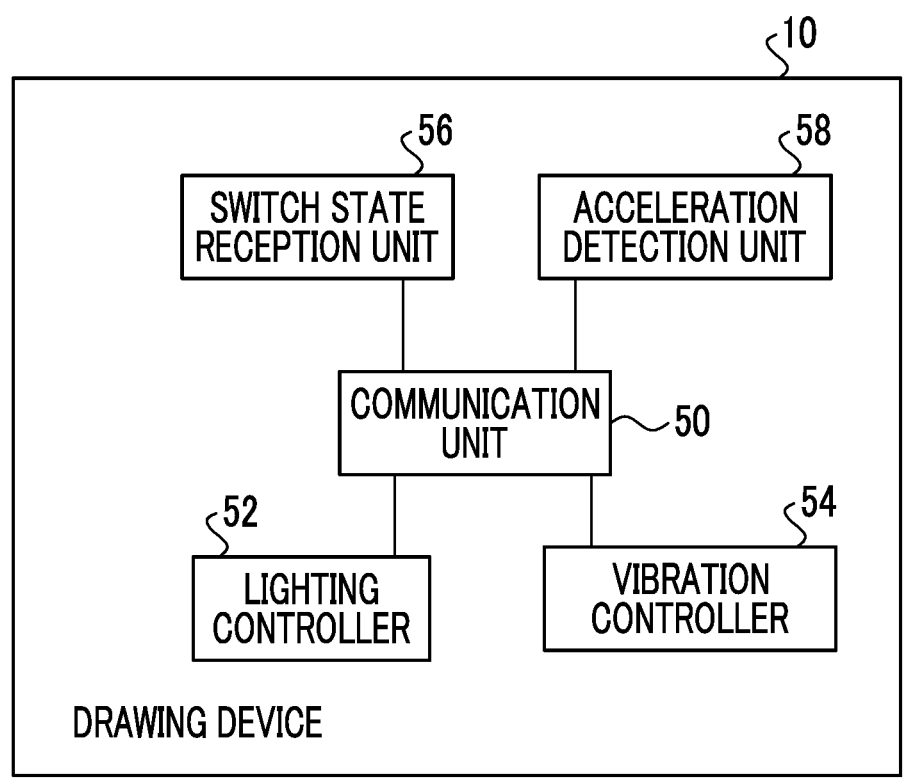
FIG. 3 is a functional block diagram showing an example of a configuration of the drawing device according to the embodiment.

FIG. 3 shows a functional block diagram representing an example of a configuration related to a function of the drawing device 10 according to the present embodiment. As shown in FIG. 3, the drawing device 10 includes a communication unit 50, a lighting controller 52, a vibration controller 54, a switch state reception unit 56, and an acceleration detection unit 58. As an example, in the drawing device 10 according to the present embodiment, by the processor 20 executing the drawing control program 25 stored in the storage unit 24, the processor 20 functions as the communication unit 50, the lighting controller 52, the vibration controller 54, the switch state reception unit 56, and the acceleration detection unit 58.

The communication unit 50 has a function of communicating various signals with the smartphone 12 via the I/F unit 23. As an example, the communication unit 50 of the present embodiment receives from the smartphone 12 a lighting instruction instructing the lighting of the light source 32 and an extinguishing instruction instructing the extinguishing of the light source 32. The communication unit 50 outputs the received lighting instruction and extinguishing instruction to the lighting controller 52.

Further, the communication unit 50 receives from the smartphone 12 a detection start signal representing that detection of the light emitted from the light source 32 of the drawing device 10 is started and a detection end signal representing that the detection of the light emitted from the light source 32 of the drawing device 10 is ended. The communication unit 50 outputs the received detection start signal and detection end signal to the vibration controller 54. The detection start signal and the detection end signal of the present embodiment are examples of a second signal of the present disclosure.

Further, a drawing start instruction representing that the drawing switch 28A is operated to start a drawing and a drawing end instruction representing that the drawing switch 28A is operated to end a drawing by the drawing user are input from the switch state reception unit 56 to the communication unit 50. The communication unit 50 transmits the input drawing start instruction and drawing end instruction to the smartphone 12.

Further, a drawing condition signal representing information related to the drawing condition designated by the imaging user is input to the communication unit 50 from the switch state reception unit 56 and the acceleration detection unit 58. The communication unit 50 transmits the input drawing condition signal to the smartphone 12. The drawing condition signal of the present embodiment is an example of a first signal of the present disclosure.

The lighting controller 52 has a function of controlling lighting and extinguishing of the light source 32. As an example, the lighting controller 52 of the present embodiment performs control of lighting the light source 32 in a case where the lighting instruction is input from the communication unit 50. Further, the lighting controller 52 performs control of extinguishing the light source 32 in a case where the extinguishing instruction is input from the communication unit 50.

Figure 4:
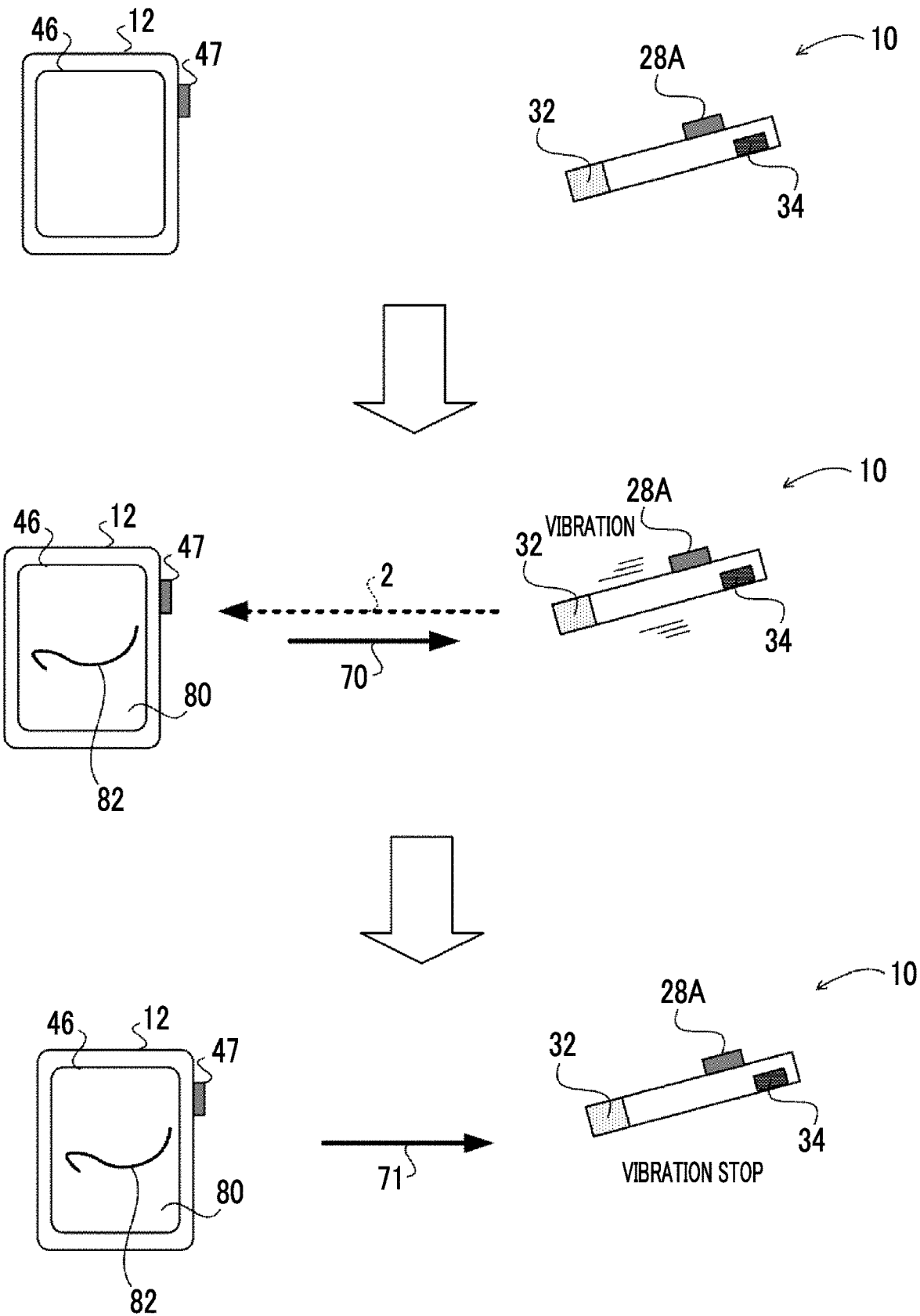
FIG. 4 is a diagram illustrating a detection start signal and a detection end signal output from a smartphone to the drawing device.

The vibration controller 54 has a function of causing the drawing device 10 to vibrate by the vibration unit 34. As shown in FIG. 4, in a case where the light is emitted from the light source 32 of the drawing device 10, the camera 47 of the smartphone 12 captures the light 2 emitted from the drawing device 10. In a case where the light 2 is detected from the captured image, which is captured by the camera 47, the smartphone 12 performs a drawing according to a detection result of the detected light 2 and a drawing condition. FIG. 4 shows an example in which the drawing image 80 in which the line drawing 82 is drawn is displayed on the display 46 as a live view image based on the detection result of the light 2 and the drawing condition. In a case where the detection of the light 2 is started from the captured image, the smartphone 12 transmits a detection start signal 70 to the drawing device 10. As a result, in the drawing device 10 of the present embodiment, the communication unit 50 receives the detection start signal 70. In a case where the detection start signal 70 is input from the communication unit 50, the vibration controller 54 performs control of causing the vibration unit 34 to start vibration of the drawing device 10.

As shown in FIG. 4, thereafter, in a case where the drawing device 10 stops emitting light, the smartphone 12 cannot detect the light 2 from the captured image, which is captured by the camera 47. In a case where the detection of the light 2 is ended, the smartphone 12 transmits a detection end signal 71 to the drawing device 10. As a result, in the drawing device 10 of the present embodiment, the communication unit 50 receives the detection end signal 71. In a case where the detection end signal 71 is input from the communication unit 50, the vibration controller 54 performs control of causing the vibration unit 34 to stop the vibration of the drawing device 10. The detection end signal 71 is output from the smartphone 12 to the drawing device 10 not only in a case where the drawing device 10 stops emitting light but also in a case where the light 2 cannot be detected from the captured image. For example, in a case where a position of the drawing device 10 is out of an imaging range of the camera 47 of the smartphone 12, since the light 2, which is emitted from the light source 32 of the drawing device 10, is not included in the captured image, the detection end signal 71 is output from the smartphone 12 to the drawing device 10.

The switch state reception unit 56 has a function of receiving a state of the drawing switch 28A operated by the drawing user. As an example, in a case where the switch state reception unit 56 of the present embodiment receives that the drawing user presses the drawing switch 28A in the first step, the switch state reception unit 56 outputs the drawing start instruction to the communication unit 50. Further, as an example, in a case where the switch state reception unit 56 of the present embodiment receives that the drawing user presses the drawing switch 28A in the third step, the switch state reception unit 56 outputs the drawing end instruction to the communication unit 50.

Figure 5:
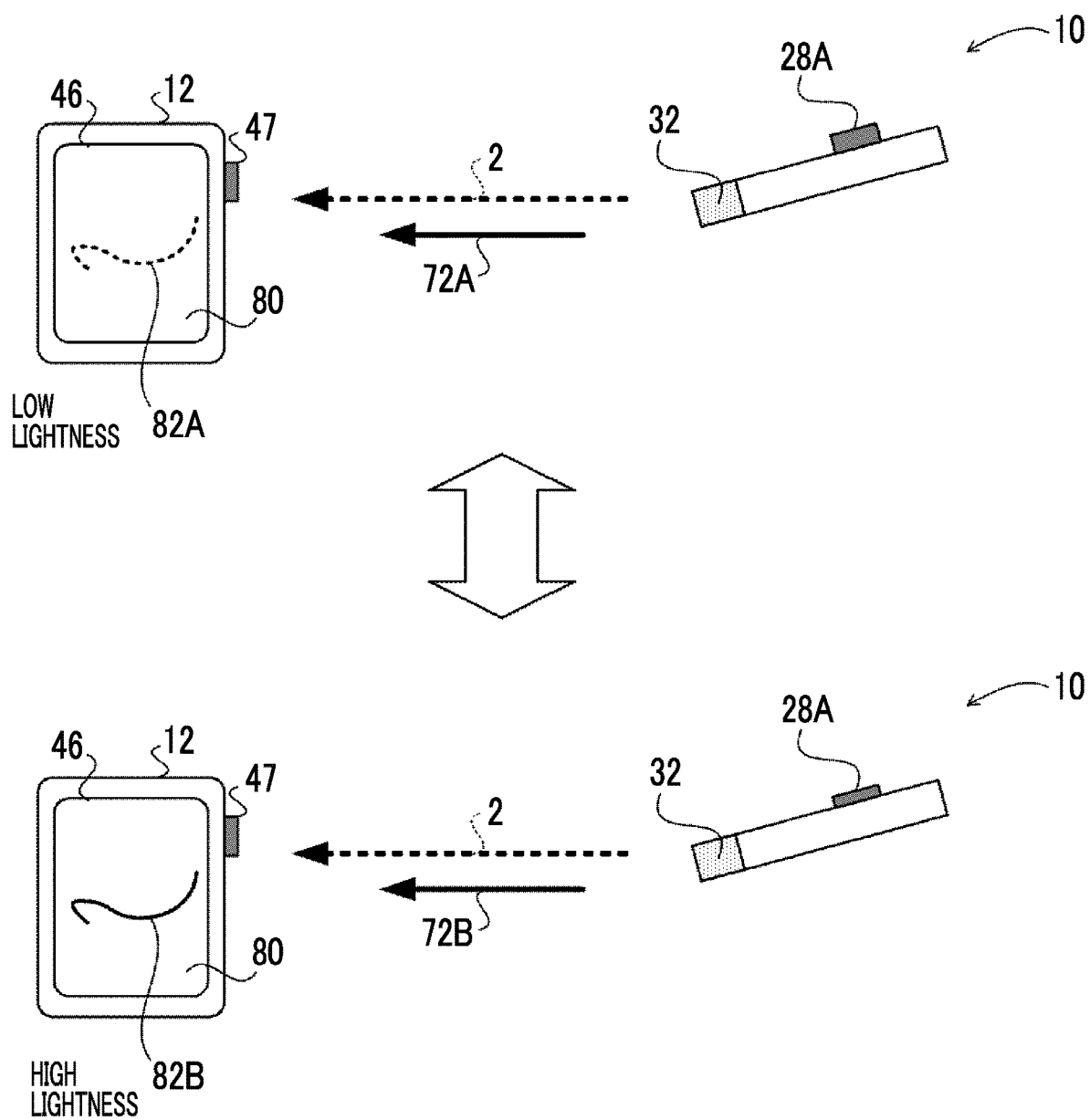
FIG. 5 is a diagram illustrating a drawing condition signal output from the drawing device to the smartphone based on a pressing state of a drawing switch.

Further, in the switch state reception unit 56 of the present embodiment, as shown in FIG. 5, as an example, in a case where the pressing state of the drawing switch 28A is the first step, the fact that a line drawing 82A with low lightness is to be drawn, is set as a drawing condition. Further, in a case where the pressing state of the drawing switch 28A is the second step, the fact that a line drawing 82B with high lightness is to be drawn, is set as a drawing condition.

As shown in FIG. 5, in a case where the switch state reception unit 56 receives the fact that the drawing switch 28A is pressed with the first step, the switch state reception unit 56 outputs to the communication unit 50 a drawing condition signal 72A representing that the line drawing 82A with low lightness is to be drawn. The communication unit 50 outputs the drawing condition signal 72A to the smartphone 12. The smartphone 12 displays the drawing image 80 including the line drawing 82A drawn based on the detection result of the light 2 on the display 46 as a live view image based on the received drawing condition signal 72A.

Further, as shown in FIG. 5, in a case where the switch state reception unit 56 receives the fact that the drawing switch 28A is pressed with the second step, the switch state reception unit 56 outputs to the communication unit 50 a drawing condition signal 72B representing that the line drawing 82B with high lightness is to be drawn. The communication unit 50 outputs the drawing condition signal 72B to the smartphone 12. The smartphone 12 displays the drawing image 80 including the line drawing 82B drawn based on the detection result of the light 2 on the display 46 as a live view image based on the received drawing condition signal 72B.

The specific contents represented by the drawing condition signal 72A and the drawing condition signal 72B are not limited. For example, the drawing condition signal 72A may be a signal representing that the drawing switch 28A is pressed with the first step, or the drawing condition signal 72B may be a signal representing that the drawing switch 28A is pressed with the second step. In this case, the smartphone 12 specifies whether to draw the line drawing 82A or the line drawing 82B based on the received drawing condition signal 72A or the drawing condition signal 72B, and performs a drawing. Further, for example, the drawing condition signal 72A may be a signal instructing to draw the line drawing 82A with low lightness, and the drawing condition signal 72B may be a signal instructing to draw the line drawing 82B with high lightness. In this case, the smartphone 12 performs a drawing of the line drawing 82A or the line drawing 82B instructed by the received drawing condition signal 72A or the drawing condition signal 72B.

Figure 6:
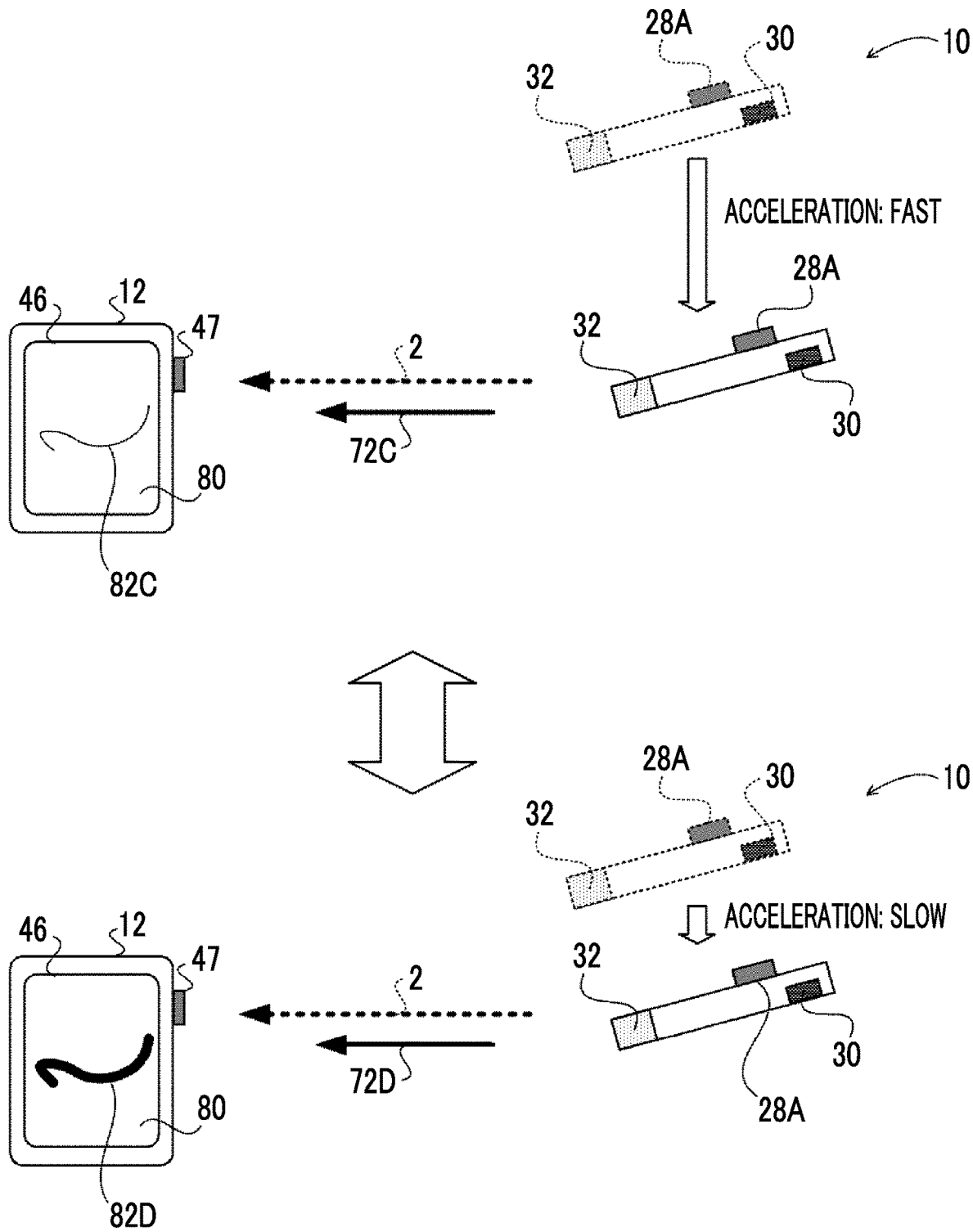
FIG. 6 is a diagram illustrating a drawing condition signal output from the drawing device to the smartphone based on a detection result of an acceleration sensor.

The acceleration detection unit 58 has a function of detecting the acceleration in the movement of the drawing device 10 based on the detection result of the acceleration sensor 30. As shown in FIG. 6, as an example, in a case where the acceleration in the movement of the drawing device 10 is fast, the fact that a thin line drawing 82C is to be drawn, is set as a drawing condition. Further, in a case where the acceleration in the movement of the drawing device 10 is slow, the fact that a thick line drawing 82D is to be drawn, is set as a drawing condition. It should be noted that whether the acceleration is fast or slow can be determined from a preset threshold value.

As shown in FIG. 6, the acceleration detection unit 58 outputs a drawing condition signal 72C representing that the thin line drawing 82C is to be drawn to the communication unit 50 in a case where the acceleration detected by the acceleration sensor 30 is fast. The communication unit 50 outputs the drawing condition signal 72C to the smartphone 12. The smartphone 12 displays the drawing image 80 including the line drawing 82C drawn based on the detection result of the light 2 on the display 46 as a live view image based on the received drawing condition signal 72C.

Further, as shown in FIG. 6, the acceleration detection unit 58 outputs a drawing condition signal 72D representing that the thick line drawing 82D is to be drawn to the communication unit 50 in a case where the acceleration detected by the acceleration sensor 30 is slow. The communication unit 50 outputs the drawing condition signal 72D to the smartphone 12. The smartphone 12 displays the drawing image 80 including the line drawing 82D drawn based on the detection result of the light 2 on the display 46 as a live view image based on the received drawing condition signal 72D.

The specific contents represented by the drawing condition signal 72C and the drawing condition signal 72D are not limited. For example, the drawing condition signal 72D and the drawing condition signal 72C may be signals representing the acceleration itself detected by the acceleration sensor 30. In this case, the smartphone 12 specifies whether to draw the line drawing 82C or the line drawing 82D based on the received drawing condition signal 72C or the drawing condition signal 72D, and performs a drawing. Further, for example, the drawing condition signal 72C may be a signal instructing to draw the thin line drawing 82C, and the drawing condition signal 72D may be a signal instructing to draw the thick line drawing 82D. In this case, the smartphone 12 performs a drawing of the line drawing 82C or the line drawing 82D instructed by the received drawing condition signal 72C or the drawing condition signal 72D.

Figure 7:
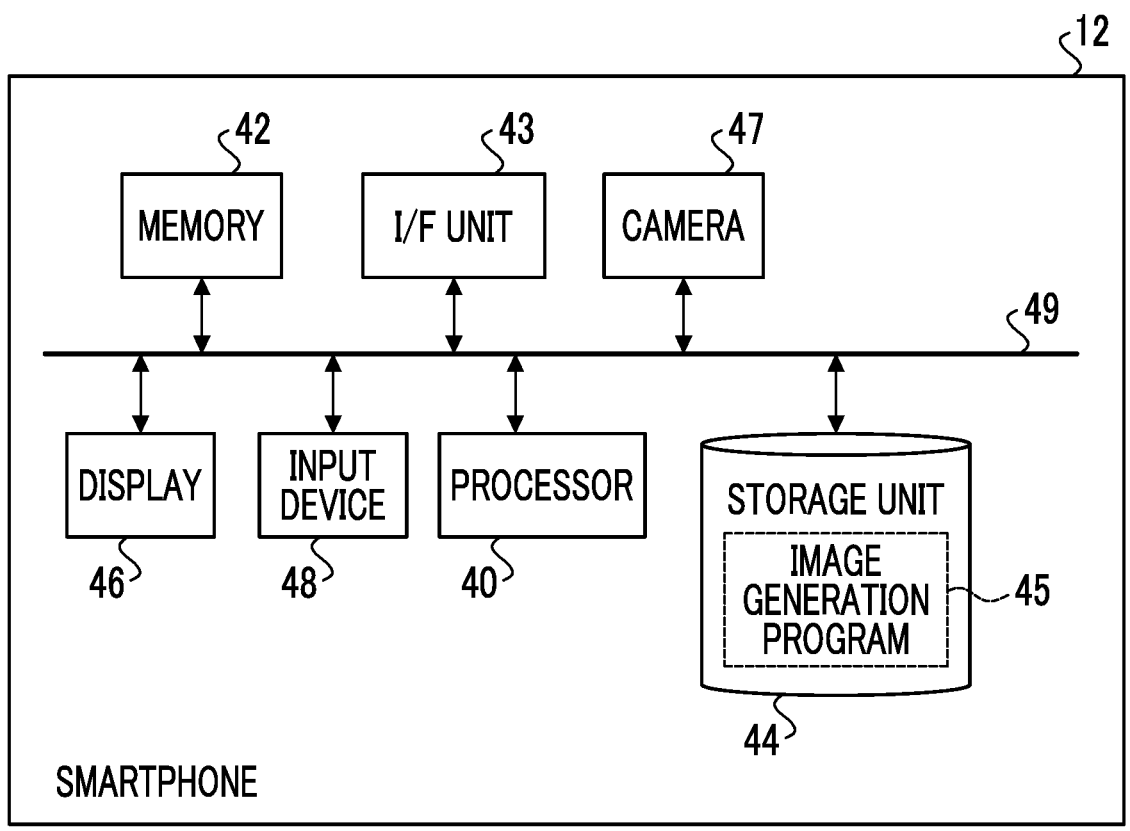
FIG. 7 is a block diagram showing an example of a hardware configuration of a smartphone according to the embodiment.

Next, the smartphone 12 of the present embodiment will be described. The smartphone 12 of the present embodiment is an example of an image generation device of the present disclosure. FIG. 7 is a block diagram representing an example of a configuration related to a function for a space drawing in the smartphone 12. As shown in FIG. 7, the smartphone 12 includes a processor 40, a memory 42, an I/F unit 43, a storage unit 44, a display 46, a camera 47, and an input device 48. The processor 40, the memory 42, the I/F unit 43, the storage unit 44, the display 46, the camera 47, and the input device 48 are connected to each other via a bus 49 such as a system bus or a control bus so that various types of information can be exchanged.

The processor 40 reads various programs including an image generation program 45 stored in the storage unit 44 into the memory 42 and executes processing according to the read program. The memory 42 is a work memory for the processor 40 to execute the processing. The storage unit 44 stores the image generation program 45, various other information, and the like. The image generation program 45 of the present embodiment is an example of a communication program of the present disclosure. Specific examples of the storage unit 44 include an HDD and an SSD.

The I/F unit 43 communicates various types of information with the drawing device 10 by wireless communication or wired communication. The display 46 and the input device 48 function as user interfaces. The display 46 displays a captured image obtained being captured by the camera 47 in a live view and provides various types of information related to drawing. The display 46 is not particularly limited, and examples thereof include a liquid crystal monitor and an LED monitor. Further, the input device 48 is operated by the imaging user for inputting various instructions related to drawing. The input device 48 is not particularly limited, and examples thereof include a keyboard, a touch pen, and a mouse. The input device 48 of the present embodiment includes a shutter button of the camera 47. The smartphone 12 adopts a touch panel display in which the display 46 and the input device 48 are integrated.

Figure 8:
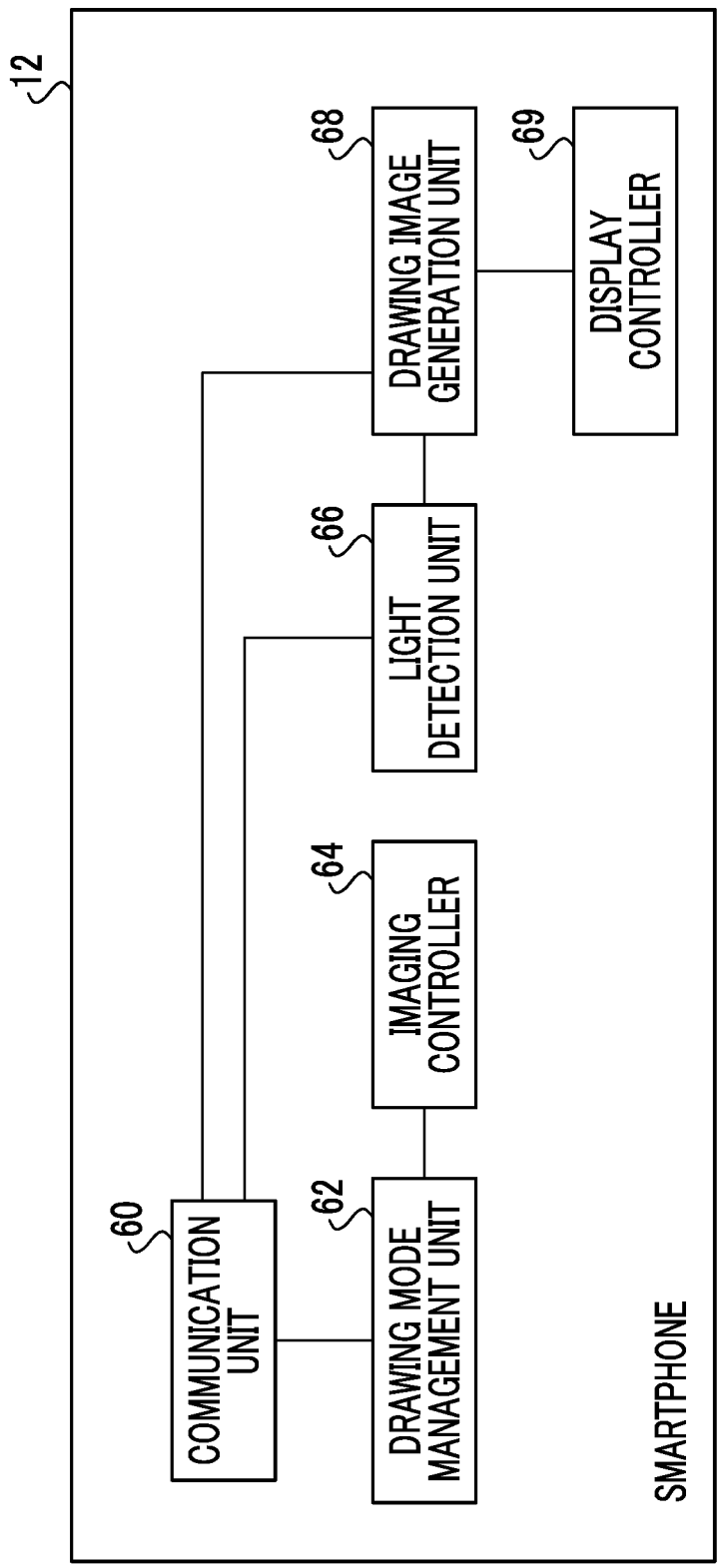
FIG. 8 is a functional block diagram showing an example of a configuration of a smartphone according to the embodiment.

FIG. 8 shows a functional block diagram representing an example of a configuration related to the function of the smartphone 12 of the present embodiment. As shown in FIG. 8, the smartphone 12 includes a communication unit 60, a drawing mode management unit 62, an imaging controller 64, a light detection unit 66, a drawing image generation unit 68, and a display controller 69. As an example, in the smartphone 12 according to the present embodiment, by the processor 40 executing the image generation program 45 stored in the storage unit 44, the processor 40 functions as the communication unit 60, the drawing mode management unit 62, the imaging controller 64, the light detection unit 66, the drawing image generation unit 68, and the display controller 69.

The communication unit 60 has a function of communicating various signals with the drawing device 10 via the I/F unit 43. As an example, as described above, the communication unit 60 of the present embodiment receives the drawing start instruction, the drawing end instruction, and the drawing condition signals 72A to 72D from the drawing device 10. The communication unit 60 outputs the received drawing start instruction, drawing end instruction, and drawing condition signals 72A to 72D to the drawing image generation unit 68.

Further, a lighting instruction and an extinguishing instruction are input to the communication unit 60 from the drawing mode management unit 62. As described above, the communication unit 60 transmits the input lighting instruction and extinguishing instruction to the drawing device 10.

Further, the detection start signal 70 and the detection end signal 71 are input to the communication unit 60 from the light detection unit 66. As described above, the communication unit 60 transmits the input detection start signal 70 and detection end signal 71 to the drawing device 10.

The drawing mode management unit 62 has a function of managing the transition to the drawing mode and the end of the drawing mode. As an example, in a case where the drawing mode management unit 62 of the present embodiment receives a transition instruction to the drawing mode described in detail later, which is performed by the imaging user using the input device 48, the drawing mode management unit 62 performs the transition to the drawing mode. Further, the drawing mode management unit 62 outputs the lighting instruction to the communication unit 60. On the other hand, in a case where the drawing mode management unit 62 receives an end instruction of the drawing mode described in detail later, which is performed by the imaging user using the input device 48, the drawing mode management unit 62 ends the drawing mode. Further, the drawing mode management unit 62 outputs the extinguishing instruction to the communication unit 60.

The imaging controller 64 has a function of controlling the capturing of the captured image by the camera 47. As an example, the camera 47 of the present embodiment includes an imaging element (not shown) such as a complementary metal oxide semiconductor (CMOS), and is capable of capturing an RGB color image. In the present embodiment, an image that is captured by the imaging element of the camera 47 is referred to as a "captured image". During the drawing mode, the imaging controller 64 captures a captured image of a plurality of frames as a moving image by controlling the camera 47.

The light detection unit 66 has a function of detecting the light of the light source 32 of the drawing device 10 from the captured image, which is captured by the camera 47. Strictly speaking, the light detection unit 66 has a function of detecting an image representing the light 2 of the light source 32, which is included in the captured image. For example, since the drawing user draws in space by moving the drawing device 10 in a state where the light source 32 is lit, the light detection unit 66 detects the trajectory of the light 2 of the light source 32 from a series of captured images. In the present embodiment, as described above, the color and the luminance of the light 2 are predetermined for the light source 32 of the drawing device 10. Therefore, the light detection unit 66 detects the light 2 of the light source 32 from the captured image based on the predetermined color and luminance of the light 2. The detection result of the light 2 detected by the light detection unit 66 is output to the drawing image generation unit 68. Further, in a case where the light detection unit 66 starts the detection of the light 2 from the captured image, the detection start signal 70 is output to the communication unit 60, and in a case where the light detection unit 66 ends the detection of the light 2, the detection end signal 71 is output to the communication unit 60.

The drawing image generation unit 68 has a function of generating the drawing image 80 based on the detection result of the light detection unit 66. As an example, the drawing image generation unit 68 of the present embodiment generates the drawing image 80 by drawing the line drawings 82A to 82D, which are obtained according to the drawing conditions represented by the drawing condition signals 72A to 72D received from the drawing device 10, based on the trajectory of the light 2 of the light source 32 of the drawing device 10 detected by the light detection unit 66. The drawing image generation unit 68 outputs the generated drawing image 80 to the display controller 69.

The display controller 69 has a function of displaying the drawing image 80, which is generated by the drawing image generation unit 68, on the display 46. During the drawing mode, the display controller 69 of the present embodiment displays the drawing image, which is generated by the drawing image generation unit 68, on the display 46 as a live view image of the camera 47.

Figure 9:
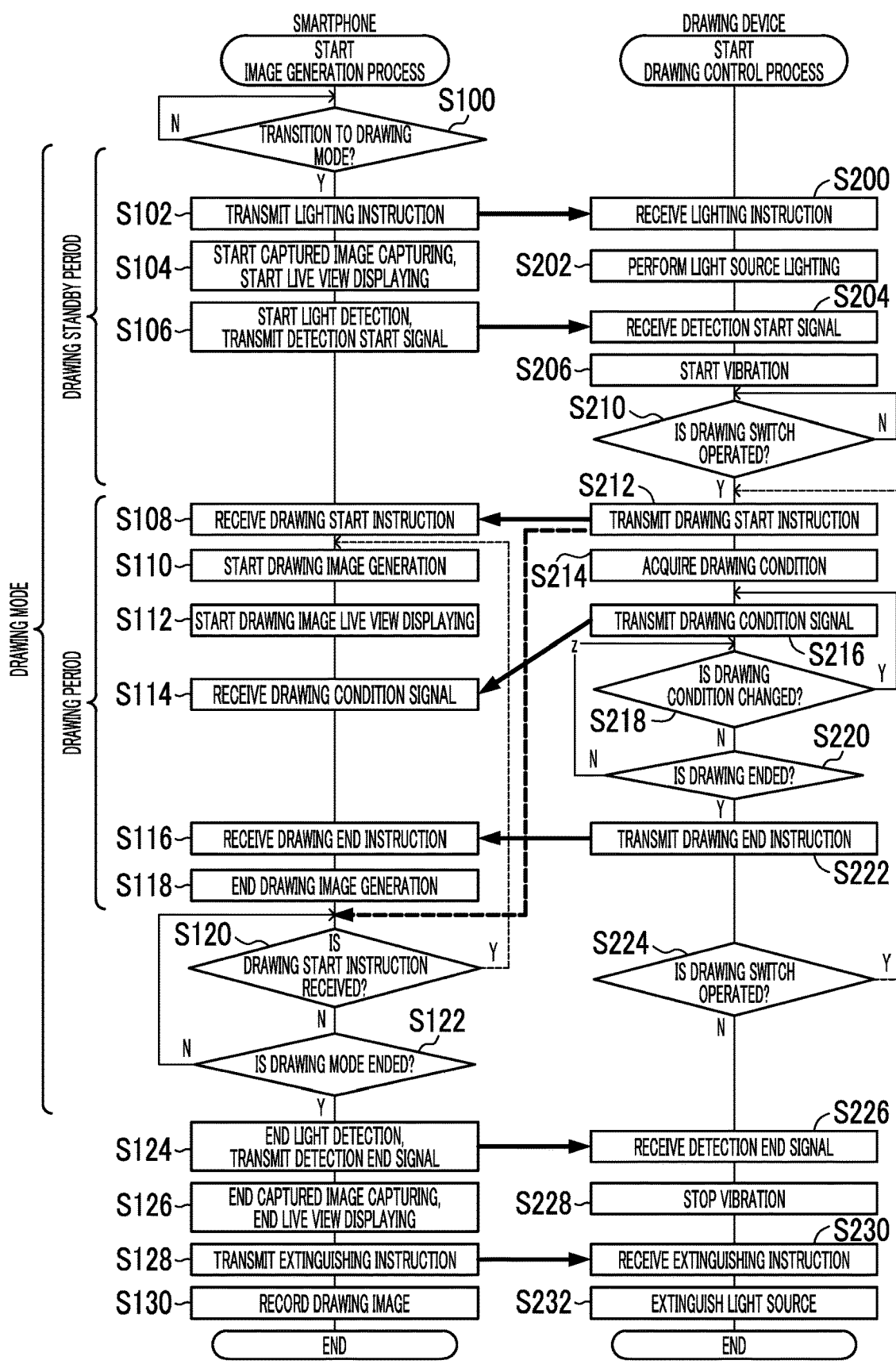
FIG. 9 is a flowchart illustrating an example of an image generation process executed by the smartphone and a drawing control process executed by the drawing device according to the embodiment.

Next, an operation of the space drawing system 1 according to the present embodiment will be described. FIG. 9 is a flowchart illustrating an example of an image generation process executed by the smartphone 12 and a drawing control process executed by the drawing device 10. The smartphone 12 executes the image generation process shown in FIG. 9 by executing the image generation program 45 stored in the storage unit 44. Further, the drawing device 10 executes the drawing control process shown in FIG. 9 by executing the drawing control program 25 stored in the storage unit 24.

In a case where drawing is performed by the space drawing system 1, first, the imaging user instructs the input device 48 of the smartphone 12 to make a transition to the drawing mode.

Therefore, in the smartphone 12, in step S100, the drawing mode management unit 62 determines whether or not to make a transition to the drawing mode. The determination in step S100 is determined to be negative until the instruction to make a transition to the drawing mode is performed. On the other hand, in a case where the instruction to make a transition to the drawing mode is performed, the transition to the drawing mode is made, the determination in step S100 is determined to be positive, and the process proceeds to step S102. A period from the next step S102 until the drawing start instruction is acquired (see step S108) is a drawing standby period.

In step S102, the communication unit 50 transmits the lighting instruction to the drawing device 10. Specifically, as described above, the drawing mode management unit 62 outputs the lighting instruction to the communication unit 60, and the communication unit 60 transmits the lighting instruction to the drawing device 10 via the I/F unit 43. In a case where the lighting instruction is transmitted from the smartphone 12, in the drawing device 10, the communication unit 50 receives the lighting instruction in step S200, and the lighting controller 52 lights the light source 32 as described above in the next step S202.

In the next step S104, the imaging controller 64 starts capturing the captured image by using the camera 47 as described above. The camera 47 captures a plurality of captured images at a predetermined frame rate based on the control of the imaging controller 64. Further, the drawing image generation unit 68 starts the display of the captured image on the display 46 as a live view image.

In the next step S106, the light detection unit 66 starts the detection of the light 2 of the light source 32 from the captured image and outputs the detection start signal 70 to the communication unit 60. The communication unit 60 transmits the detection start signal 70 to the drawing device 10 via the I/F unit 43. In a case where the detection start signal 70 is transmitted from the smartphone 12, in the drawing device 10, the communication unit 50 receives the detection start signal 70 in step S204, and in the next step S206, the vibration controller 54 causes the vibration unit 34 to vibrate the drawing device 10 as described above. By making the drawing device 10 vibrate, the drawing user can recognize that the smartphone 12 starts the detection of the light 2 emitted from the light source 32 and it is in a state in which a drawing with the light 2 is possible.

In a case where the drawing is started, the drawing user operates the drawing switch 28A as described above to make instructions of the start of drawing and the drawing condition. In step S210, a negative determination is made until the switch state reception unit 56 receives that the drawing user operates the drawing switch 28A to start a drawing, and in a case where the switch state reception unit 56 receives the start of drawing, a positive determination is made, and the process proceeds to step S212. In this case, the switch state reception unit 56 outputs the drawing start instruction to the communication unit 50. In the next step S212, the communication unit 50 transmits the drawing start instruction to the smartphone 12 via the I/F unit 23.

In a case where the drawing start instruction is transmitted from the drawing device 10, in the smartphone 12, the communication unit 60 receives the drawing start instruction via the I/F unit 43 in step S108. The communication unit 60 outputs the received drawing start instruction to the drawing image generation unit 68. In a case where the drawing start instruction is input to the light detection unit 66, the drawing standby period ends, the transition is made to the drawing period, and it becomes an in-drawing period.

In the next step S110, as described above, the drawing image generation unit 68 starts the generation of the drawing image 80 in accordance with the drawing condition, based on the detection result of the light detection unit 66. In the next step S112, the display controller 69 starts the display of the drawing image 80 generated by the drawing image generation unit 68 on the display 46 as a live view image.

On the other hand, in the drawing device 10, in a case where the drawing is started by the drawing user, the switch state reception unit 56 acquires the drawing condition corresponding to the pressing state of the drawing switch 28A as described above in step S214. Further, the acceleration detection unit 58 acquires the drawing condition according to the detection result of the acceleration sensor 30.

As described above in the next step S216, the communication unit 50 transmits the drawing condition signals 72A to 72D to the smartphone 12 via the I/F unit 23. In the next step S218, the communication unit 50 determines whether or not the drawing condition is changed. The communication unit 50 of the present embodiment determines whether the drawing condition is changed based on whether the drawing condition signal, among the drawing condition signals 72A to 72D, that is input from the switch state reception unit 56 and the acceleration detection unit 58 is changed. In a case where the drawing condition is changed, the process returns to step S216, and the communication unit 50 transmits the changed drawing condition signal to the smartphone 12 via the I/F unit 23. On the other hand, in a case where the drawing condition is not changed, the determination in step S218 is determined to be negative, and the process proceeds to step S220.

In this way, in a case where any of the drawing condition signals 72A to 72D is transmitted from the drawing device 10, in the smartphone 12, in step S114, the communication unit 60 receives any one of the drawing condition signals 72A to 72D transmitted by the drawing device 10 via the I/F unit 43.

On the other hand, in the drawing device 10, in a case where a negative determination is made in step S218, the process proceeds to step S220. In step S220, the communication unit 50 determines whether or not to end the drawing. As described above, in the drawing device 10 of the present embodiment, in a case where the drawing switch 28A is pressed most strongly by the drawing user as the third step, the drawing switch 28A returns to its original state, and the fact that the drawing is ended is designated by the drawing user. The determination in step S220 is determined to be negative until the switch state reception unit 56 receives the fact that the pressing state of the drawing switch 28A is the third step, and the process returns to step S218. On the other hand, the determination in step S220 is determined to be positive in a case where the switch state reception unit 56 receives the fact that the pressing state of the drawing switch 28A is the third step, and the process proceeds to step S222. In step S222, the communication unit 50 transmits the drawing end instruction to the smartphone 12 via the I/F unit 23.

In this way, in a case where the drawing end instruction is output from the drawing device 10, in the smartphone 12, the communication unit 60 receives the drawing end instruction via the I/F unit 43 in step S116 and outputs the drawing end instruction to the drawing image generation unit 68. In the next step S118, the drawing image generation unit 68 ends the generation of the drawing image. In a case where the drawing image generation unit 68 ends the generation of the drawing image, the drawing period is ended.

In a case where the drawing user, who performs a drawing using the drawing device 10, wants to perform a drawing in another region of the imaging space, or the like, the drawing user temporarily sets the pressing state of the drawing switch 28A to the third step, ends the drawing, moves the drawing device 10 to another region where the drawing user wants to draw, and presses the drawing switch 28A again to start a drawing. Therefore, it is determined whether or not the switch state reception unit 56 of the drawing device 10 receives the fact that the drawing switch 28A is operated again by the drawing user. In a case where the fact that the drawing switch 28A is operated is not received, the determination in step S224 is determined to be negative, and the process proceeds to step S226. On the other hand, in a case where the fact that the drawing switch 28A is operated is received, the determination in step S224 is determined to be positive, the process returns to step S212, and the processes of steps S212 to S222 are repeated.

Therefore, the smartphone 12 determines whether or not the drawing start instruction is received in step S120 after the generation of the drawing image is ended in step S118. As described above, in a case where the drawing user operates the drawing switch 28A again, the drawing start instruction is transmitted again from the drawing device 10 to the smartphone 12. In a case where the communication unit 60 receives the drawing start instruction again, the determination in step S120 is determined to be positive, the process returns to step S110, the transition is made to the drawing period again, and the processes of steps S110 to S118 are repeated. On the other hand, in a case where the communication unit 60 does not receive the drawing start instruction, the determination in step S120 is determined to be negative, and the process proceeds to step S122.

In step S122, the drawing mode management unit 62 determines whether or not to end the drawing mode. As an example, in the present embodiment, in a case where the imaging user presses a shutter button included in the input device 48, the drawing mode is ended. Therefore, in a case where the shutter button is not pressed, the determination in step S122 is determined to be negative, and the process returns to step S120. On the other hand, in a case where the shutter button is pressed, the determination in step S122 is determined to be positive, and the process proceeds to step S124.

In step S124, the light detection unit 66 ends the detection of the light 2 from the captured image. In a case where the light detection unit 66 ends the detection of the light 2, the light detection unit 66 outputs the detection end signal 71 to the communication unit 60 as described above. The communication unit 60 transmits the detection end signal 71 to the drawing device 10 via the I/F unit 43. In a case where the detection end signal 71 is transmitted from the smartphone 12, in the drawing device 10, the communication unit 50 receives the detection end signal 71 in step S226, and in the next step S228, the vibration controller 54 causes the vibration unit 34 to stop the vibration of the drawing device 10 as described above.

On the other hand, in the smartphone 12, in step S126, the imaging controller 64 ends the capturing of the captured image by the camera 47. Further, the display controller 69 ends the display of the live view image (the drawing image 80) displayed on the display 46.

In next step S128, the communication unit 50 transmits the extinguishing instruction to the drawing device 10. Specifically, as described above, the drawing mode management unit 62 outputs the lighting instruction to the communication unit 60, and the communication unit 60 transmits the extinguishing instruction to the drawing device 10 via the I/F unit 43. In a case where the extinguishing instruction is transmitted from the smartphone 12, in the drawing device 10, the communication unit 50 receives the extinguishing instruction in step S230, and the lighting controller 52 extinguishes the light source 32 as described above in the next step S232. In a case where the process in step S232 is ended, the drawing control process shown in FIG. 9 is ended in the drawing device 10.

On the other hand, in the smartphone 12, in step S130, the drawing image generation unit 68 records the generated drawing image 80 in the storage unit 44. In a case where the process in step S130 is ended, the image generation process shown in FIG. 9 is ended.

As described above, the drawing device 10 of the present embodiment includes a light source 32 that emits the light 2 and the processor 20. The communication unit 50 of the drawing device 10 transmits the drawing condition signals 72A to 72D representing information related to the drawing condition of the drawing image 80 to the smartphone 12 that generates the drawing image 80 based on the detection result of detecting the light 2. Further, the communication unit 50 receives the detection start signal 70 and the detection end signal 71, which represent information related to the detection state of the light 2, from the smartphone 12.

On the other hand, the smartphone 12 of the present embodiment includes the camera 47 that captures the light 2 emitted from the drawing device 10 and a processor 40 that is configured to generate a drawing image 80 based on the detection result of the light 2 detected from the captured image, which is captured by the camera 47. The communication unit 60 of the smartphone 12 receives the drawing condition signals 72A to 72D representing the information related to the drawing condition of the drawing image 80 from the drawing device 10. Further, the communication unit 60 transmits the detection start signal 70 representing the information related to the detection state of the light 2 to the drawing device 10.

As described above, according to the drawing device 10 or the smartphone 12 of the present embodiment, the drawing user can easily recognize the state of the smartphone 12 with respect to the drawing. For example, since the drawing user can easily recognize whether or not the light 2, which is emitted from the light source 32 of the drawing device 10, is detected by the smartphone 12, it is possible to appropriately determine a timing of performing a drawing operation. Further, the drawing user can easily instruct the smartphone 12 of the drawing condition. Therefore, the operability of the drawing user, who performs a drawing, can be improved by any of the drawing device 10 or the smartphone 12 of the present embodiment.

In the above-described form, a form of the drawing image generation unit 68 of the smartphone 12 in which an image drawn based on the detection result of the light 2 is the line drawing 82, and the lightness or the thickness is changed based on the drawing conditions, has been described, but the drawing conditions of the line drawing 82 is not limited to these. For example, the color of the line to be drawn, a line type such as a dotted line or a solid line, or the like may be used. Further, the drawing conditions may be, for example, only one, such as only the lightness, or may be plural, such as the lightness and the plurality, described above.

Figure 10:
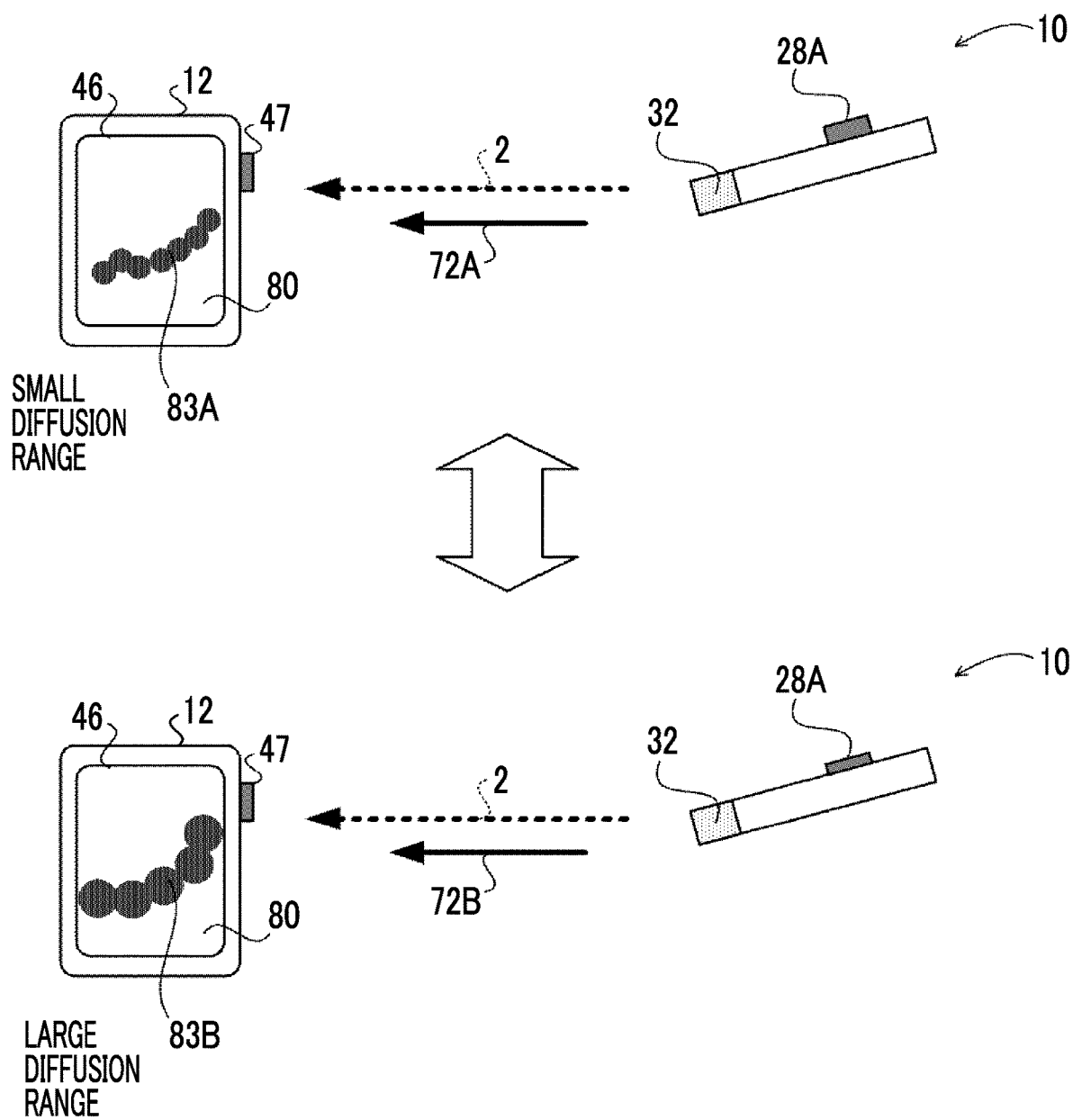
FIG. 10 is an explanatory diagram illustrating another example of a drawing image.

Further, the drawing image generation unit 68 may draw an effect based on the drawing condition. For example, as the effect, a diffuse effect such as a spray may be drawn. FIG. 10 shows an example of a form in which the diffuse effect is drawn. In the example shown in FIG. 10, in a case where the switch state reception unit 56 of the drawing device 10 receives the fact that the drawing switch 28A is pressed with the first step, the drawing condition signal 72A representing drawing of an effect image 83A of a spray with a small diffusion range is output to the communication unit 50. The communication unit 50 outputs the drawing condition signal 72A to the smartphone 12. The smartphone 12 displays the drawing image 80 including the effect image 83A drawn based on the detection result of the light 2 on the display 46 as a live view image based on the received drawing condition signal 72A. Further, as shown in FIG. 10, in a case where the switch state reception unit 56 of the drawing device 10 receives the fact that the drawing switch 28A is pressed with the second step, the drawing condition signal 72B representing drawing of an effect image 83B of a spray with a large diffusion range is output to the communication unit 50. The communication unit 50 outputs the drawing condition signal 72B to the smartphone 12. The smartphone 12 displays the drawing image 80 including the effect image 83B drawn based on the detection result of the light 2 on the display 46 as a live view image based on the received drawing condition signal 72B. The type of effect to be drawn is not limited to the spray and the like described above, and may be, for example, a soap bubble, a heart mark, a star, or the like.

Figure 11:
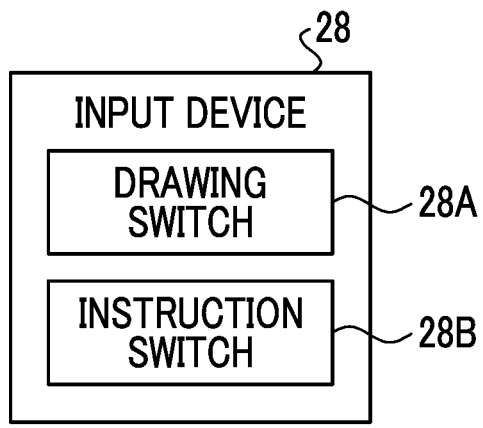
FIG. 11 is a block diagram showing an example of another configuration for performing a drawing start instruction and a drawing end instruction.

Also, in the above-described form, although the form of performing the instruction of the drawing start and the instruction of the drawing end by using the drawing switch 28A has been described, the present embodiment is not limited to this, and for example, as shown in FIG. 11, the drawing device 10 may include, as the input device 28, the instruction switch 28B for performing the instruction of the drawing start and the drawing end separately from the drawing switch 28A for performing the instruction of the drawing condition. In this case, the drawing condition, under which a drawing is performed, may be notified by vibrating the drawing device 10 by the vibration unit 34 of the drawing device 10. In this way, by notifying the drawing user of the drawing condition based on the presence or absence of vibration and the strength of the vibration, the drawing user can easily recognize what kind of drawing image 80 is generated. Therefore, according to the space drawing system 1, a more enjoyable drawing experience can be provided.

Further, in the above-described form, although the form in which the drawing condition is instructed from the drawing device 10 has been described, the present embodiment is not limited to this form, and the smartphone 12 may also be capable of instructing the drawing condition.

Further, in the above-described form, although the form in which the vibration unit 34 vibrates to notify that the light 2 is being detected has been described, the notification operation is not limited to the vibration. For example, it may be in a form of notifying by voice.

Further, in the above-described form, although the space drawing system 1 communicates with both the first signal and the second signal, the present embodiment is not limited to this form and the space drawing system 1 may be configured to communicate at least one of the first signal or the second signal.

Figure 12:
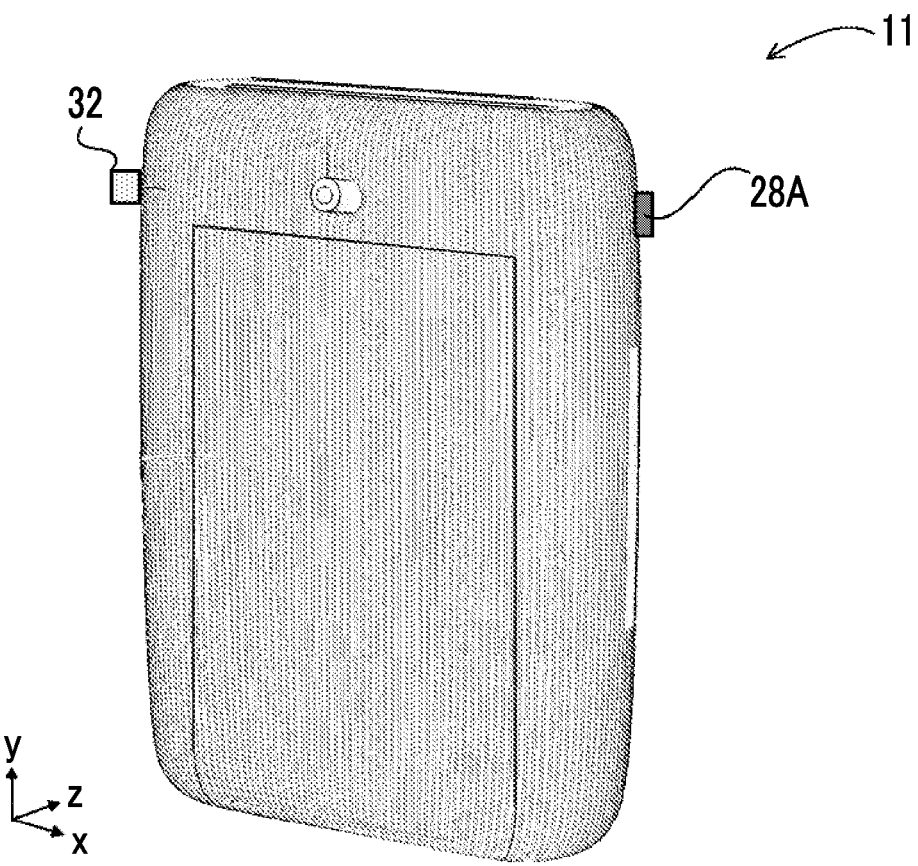
FIG. 12 is a diagram showing another example of the drawing device.

In each of the above-described forms, the case where the drawing device 10 is in a form of a light pen has been described, but a form of the drawing device is not particularly limited, and any instruction device may be used as long as it is capable of instructing drawing with light. For example, as shown in FIG. 12, a drawing device 11 having a print function may be used. The drawing device 11 shown in FIG. 12 has a function of receiving a drawing image generated by the smartphone 12 and printing the received drawing image on an instant film.

Further, in the above-described form, for example, the following various processors can be used as a hardware structure of a processing unit that executes various processes such as the communication unit 50, the lighting controller 52, the vibration controller 54, the switch state reception unit 56, and the acceleration detection unit 58 of the drawing device 10, or the communication unit 60, the drawing mode management unit 62, the imaging controller 64, the light detection unit 66, the drawing image generation unit 68, and the display controller 69 of the smartphone 12. As described above, the above described various processors include a CPU, which is a general-purpose processor that executes software (programs) and functions as various processing units, a programmable logic device (PLD), which is a processor whose circuit configuration is able to be changed after manufacturing such as a field programmable gate array (FPGA), a dedicated electric circuit, which is a processor having a circuit configuration specially designed to execute specific processing such as an application specific integrated circuit (ASIC), and the like.

One processing unit may be composed of one of these various processors or may be composed of a combination of two or more processors of the same type or different types (for example, a combination of a plurality of FPGAs or a combination of a CPU and an FPGA). Further, a plurality of processing units may be composed of one processor.

As an example of configuring a plurality of processing units with one processor, first, as represented by a computer such as a client or a server, there is a form in which one processor is configured by a combination of one or more CPUs and software, and this processor functions as a plurality of processing units. Second, as represented by a system on chip (SoC) or the like, there is a form in which a processor, which implements the functions of the entire system including a plurality of processing units with one integrated circuit (IC) chip, is used. In this way, the various processing units are configured by using one or more of the above-mentioned various processors as a hardware structure.

Further, as the hardware structure of these various processors, more specifically, an electric circuit (circuitry) in which circuit elements such as semiconductor elements are combined can be used.

Further, in each of the above-described forms, an aspect in which the drawing control program 25 is stored (installed) in the storage unit 24 in advance, and the image generation program 45 is stored (installed) in the storage unit 44 in advance has been described, but the present embodiments are not limited thereto. The drawing control program 25 and the image generation program 45 may be provided in a form recorded in a recording medium such as a compact disc read only memory (CD-ROM), a digital versatile disc read only memory (DVD-ROM), and a universal serial bus (USB) memory. Further, the drawing control program 25 and the image generation program 45 may be provided in a form of being downloaded from an external device via a network.

What is claimed is:

1. An instruction device comprising:
a light source that emits light; and
a first processor,
wherein the instruction device is configured to perform drawing in space with the light by being held and moved by a user, and
the first processor is configured to
transmit a first signal representing information related to a drawing condition of a drawing image to a second processor of an image generation device that generates a drawing image based on a detection result obtained by detecting the light that has been used for drawing, and
receive a second signal representing information related to a detection state of the light from the second processor of the image generation device.

2. The instruction device according to claim 1,
wherein the first processor is configured to execute a notification operation in which the image generation device notifies a user, based on the information related to the detection state.

3. The instruction device according to claim 2,
wherein the notification operation is an operation of vibrating the instruction device.

4. The instruction device according to claim 1,
wherein the drawing condition is a condition related to a line to be drawn based on the detection result of the light.

5. The instruction device according to claim 1,
wherein the drawing condition is a condition related to an effect to be drawn based on the detection result of the light.

6. The instruction device according to claim 1, further comprising:
an acceleration sensor,
wherein the drawing condition includes a condition that is changed based on a detection result of the acceleration sensor.

7. The instruction device according to claim 1, further comprising:
a drawing switch that is operated for designating the drawing condition.

8. The instruction device according to claim 1,
wherein the instruction device defines a period, during which the light is being detected by the image generation device, as an in-drawing period.

9. The instruction device according to claim 1, further comprising:
an instruction switch for performing a drawing start instruction and a drawing end instruction,
wherein the instruction device
transmits a drawing start signal to the image generation device in a case in which the drawing start instruction is given from the instruction switch,
transmits a drawing end signal to the image generation device in a case in which the drawing end instruction is given from the instruction switch, and
defines a period from in a case in which the drawing start signal is transmitted until in a case in which the drawing end signal is transmitted, as an in-drawing period.

10. The instruction device according to claim 1,
wherein the instruction device has a print function of printing the drawing image generated by the image generation device.

11. The instruction device according to claim 1,
wherein the instruction device is a drawing device for a space drawing.

12. An image generation device comprising:
a camera that captures light emitted from an instruction device that is configured to perform drawing in space with the light by being held and moved by a user; and
a processor that is configured to generate a drawing image based on a detection result of light that has been used for drawing, the light being detected from a captured image, which is captured by the camera,
wherein the processor is configured to
receive a first signal representing information related to a drawing condition of the drawing image from the instruction device, and
transmit a second signal representing information related to a detection state of the light to the instruction device.

13. A drawing system comprising:
an instruction device including a light source that emits light and a first processor, the instruction device being configured to perform drawing in space with the light by being held and moved by a user; and
an image generation device including a camera that captures light emitted from the instruction device and a second processor that is configured to generate a drawing image based on a detection result of light that has been used for drawing, the light being detected from a captured image, which is captured by the camera,
wherein the drawing system
transmits a first signal representing information related to a drawing condition of the drawing image from the instruction device to the image generation device, and
transmits a second signal representing information related to a detection state of the light from the image generation device to the instruction device.

14. A communication method executed by a first processor of an instruction device including a light source that emits light and the first processor, the instruction device being configured to perform drawing in space with the light by being held and moved by a user, the communication method comprising:
- transmitting a first signal representing information related to a drawing condition of a drawing image to a second processor of an image generation device that generates a drawing image based on a detection result obtained by detecting the light that has been used for drawing; and
- receiving a second signal representing information related to a detection state of the light from the second processor of the image generation device.

15. A communication method executed by a processor of an image generation device including a camera that captures light emitted from an instruction device that is configured to perform drawing in space with the light by being held and moved by a user and the processor that is configured to generate a drawing image based on a detection result of light that has been used for drawing, the light being detected from a captured image, which is captured by the camera, the communication method comprising:
- receiving a first signal representing information related to a drawing condition of the drawing image from the instruction device; and
- transmitting a second signal representing information related to a detection state of the light to the instruction device.

16. A non-transitory storage medium storing a communication program that is executed by a first processor of an instruction device including a light source that emits light and the first processor, the instruction device being configured to perform drawing in space with the light by being held and moved by a user, the communication program for causing the first processor to execute processing comprising:
- transmitting a first signal representing information related to a drawing condition of a drawing image to a second processor of an image generation device that generates a drawing image based on a detection result obtained by detecting the light that has been used for drawing; and
- receiving a second signal representing information related to a detection state of the light from the second processor of the image generation device.

17. A non-transitory storage medium storing a communication program that is executed by a processor of an image generation device including a camera that captures light emitted from an instruction device that is configured to perform drawing in space with the light by being held and moved by a user and the processor that is configured to generate a drawing image based on a detection result of light that has been used for drawing, the light being detected from a captured image, which is captured by the camera, the communication program for causing the processor to execute processing comprising:
- receiving a first signal representing information related to a drawing condition of the drawing image from the instruction device; and
- transmitting a second signal representing information related to a detection state of the light to the instruction device.

* * * * *